F. G. FEELEY.
JOINT FOR CORRUGATED PAPER BOARD.
APPLICATION FILED DEC. 27, 1913.

1,186,087.                                   Patented June 6, 1916.

WITNESSES
Chas. F. Clagett
A. M. Cassidy

INVENTOR
Frank G. Feeley
BY
HIS ATTORNEY

THE COLUMBIA PLANOGRAPH CO., WASHINGTON, D. C.

UNITED STATES PATENT OFFICE.

FRANK G. FEELEY, OF CHICAGO, ILLINOIS, ASSIGNOR TO M. D. KNOWLTON COMPANY, OF ROCHESTER, NEW YORK, A CORPORATION OF NEW YORK.

JOINT FOR CORRUGATED PAPER-BOARD.

1,186,087.     Specification of Letters Patent.     Patented June 6, 1916.

Application filed December 27, 1913. Serial No. 808,942.

*To all whom it may concern:*

Be it known that I, FRANK G. FEELEY, citizen of the United States, and resident of Chicago, in the county of Cook and State of Illinois, have invented certain new and useful Improvements in Joints for Corrugated Paper-Board, of which the following is a specification.

This invention relates to a joint for corrugated board, and especially to a joint for corrugated paperboard boxes, and the main object of the invention is to provide as a substitute for the weak taped joints heretofore used for joining sections of corrugated board a new type of joint having a strength equal to or greater than that of the board itself.

It is well known that the taped joint now in general use for joining the ends of the board in a paperboard box is the weakest part of such a box. The joint of the present invention is intended to be formed either wholly or mainly from the material of the board itself. This would be difficult to do and obtain a strong joint with corrugated board as formed in the past, as it was the regular practice to use lining sheets, particularly on the inside of the board, of insufficient strength for such a purpose. It is now intended, however, to make the corrugated board with lining papers of much greater strengths than those heretofore used, and these can be used to produce joints the strength of which will be equal to or greater than that of the board itself.

In carrying the invention into effect a corrugated board made from lining sheets and a corrugated filler of the desired strengths is reduced in cross section at an end to be joined in such a manner as to be capable of receiving a portion of the other end of the board, and the two sections to be joined when placed together are secured in position by suitable means, such as an adhesive. Usually both of the ends or sections to be connected are reduced in cross section, as by the removal of a portion thereof, and the reduced portions are then placed in overlapping relation and pasted or otherwise secured together to form a lap-joint. The reduction of the cross section however may be accomplished in a variety of ways.

Figure 1:
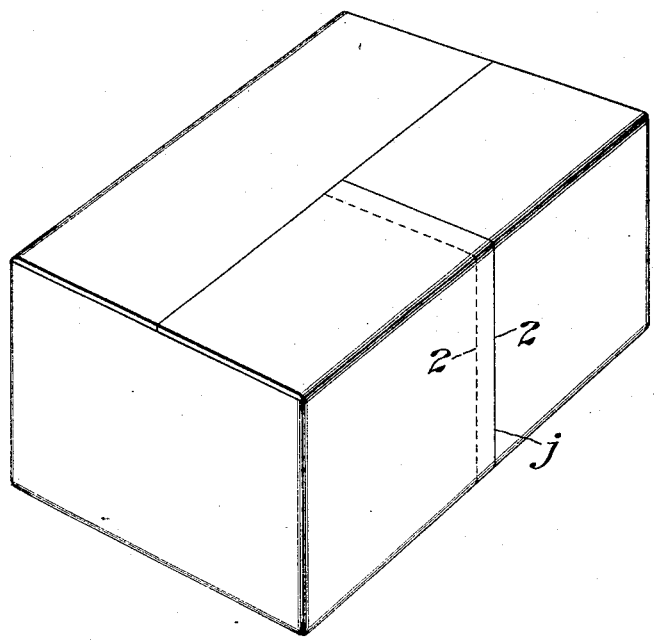
Figure 3:
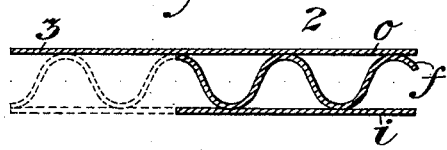
Figure 2:
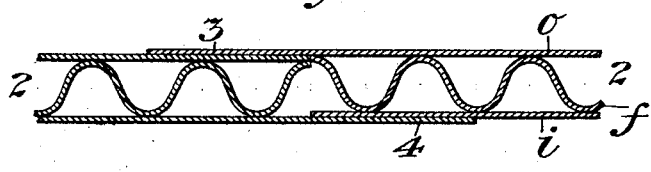

In the accompanying drawings—Figure 1 is a perspective of a one-piece container made from corrugated paperboard and having a joint formed in accordance with the present invention. Fig. 2 is an enlarged detail of one form of joint suitable for joining the ends of the board forming said container. Fig. 3 is a similar view of one end of said board, showing the first step in the operation of preparing it for the joint to be formed.

Similar characters designate like parts in all the figures of the drawings.

2—2 designate end sections of corrugated board suitable for the purpose of forming a joint from the materials of the board. This means that the filler $f$ is of suitable material and that the inner and outer lining sheets $i$ and $o$ have considerable strength—sufficient to enable them to form, when properly combined as hereinafter described, a joint that will be at least as strong as the board itself. The end sections of corrugated board so constructed may then be suitably treated to produce a suitable joint.

In the present case, the end sections 2—2 are skived along opposite edges as shown and a portion of the material of each, such as the dotted line portion in Fig. 3, is removed to permit the two end sections to be lapped and then properly secured together, as by paste or otherwise. The portions of the board removed, and the amount of the material so removed, may vary greatly. In the construction shown the material is removed to such an extent as to enable the end sections, when placed together in overlapping relation, to fill substantially exactly the cross section of the board. Here all of the filler $f$ and one of the lining sheets are removed for a considerable distance from the end of each section, leaving each end section of board with a long projecting section of lining papers, 3 or 4, adapted to lap over one of the lining sheets of the adjacent unweakened portion of the adjoining end section and be pasted down securely on such lining sheet of the adjoining section. In this manner a lap joint is formed which makes the board stronger in the zone of the joint than at any other point.

Not only is the joint produced in the manner described a radically different one from the taped joints ordinarily used, but the resulting container itself is different. In the old type of corrugated paperboard container the general practice has been to join the ends of the board at a corner to form a box having three creased corners and one taped. The natural place, however, to form a joint of the type herein described is at some point other than the corner of the box, as clearly shown at $j$ in Fig. 1, in which the box illustrated has, therefore, four creased corners.

What I claim is:—

1. A joint for double-faced corrugated board, comprising a pair of complementary board sections, one of which has a portion of the corrugated filler and the inner lining sheet removed and the other of which has a portion of the corrugated filler and the outer lining sheet removed, the sections thus treated being mated so that the unremoved portion of each lining sheet will overlap the adjacent portion of the other board section, and means to secure each of said unremoved portions of the lining sheets to the underlying adjacent portion of the other board section.

2. A joint for double-faced corrugated board, comprising a pair of complementary board sections disposed in substantially the same plane and one of which has a portion of the filler and the inner lining sheet removed and the other of which has a portion of the filler and the outer lining sheet removed, the sections thus treated being mated so that the unremoved portion of each lining sheet will overlap the adjacent portion of the other board section, and means to secure each of said unremoved portions of the lining sheets to the underlying adjacent portion of the other board section.

Signed at Chicago, in the county of Cook, and State of Illinois, this 22nd day of Dec. A. D. 1913.

FRANK G. FEELEY.

Witnesses:
  NELLIE F. MORRISSEY,
  A. BROCK.

Copies of this patent may be obtained for five cents each, by addressing the "Commissioner of Patents, Washington, D. C."